United States Patent [19]

Ward

[11] Patent Number: 5,797,544
[45] Date of Patent: Aug. 25, 1998

[54] C/D NOZZLE WITH SYNCHRONIZING RING LINK SUSPENSION

[75] Inventor: Eric J. Ward, West Palm Beach, Fla.

[73] Assignee: United Technologies Corporation, Hartford, Conn.

[21] Appl. No.: 721,889

[22] Filed: Sep. 27, 1996

[51] Int. Cl.⁶ .................................................. B64C 15/08
[52] U.S. Cl. ........................................................ 239/265.37
[58] Field of Search ........................ 239/265.19, 265.35, 239/265.37, 265.34; 60/228–232

[56] References Cited

U.S. PATENT DOCUMENTS

| | | | |
|---|---|---|---|
| 2,794,317 | 6/1957 | Brown | 239/265.39 |
| 2,926,484 | 3/1960 | Halford et al. | 239/265.39 |
| 4,641,783 | 2/1987 | Camboulives | 239/265.3 |

FOREIGN PATENT DOCUMENTS

894496  8/1961  United Kingdom .............. 239/265.39

*Primary Examiner*—Kevin Weldon
*Attorney, Agent, or Firm*—Norman Friedland

[57] ABSTRACT

The flaps of the C/D exhaust nozzle for a gas turbine engine are arranged to obtain synchronous movement relative to each other and the interconnecting fulcrum links are attached to a coaxially mounted combined piston/sync ring by an H-shaped link. One link from one convergent flap is connected to one of the fulcrum links and the adjacent convergent flap is connected to the same fulcrum link. The redundant synchronization provided by the H-shaped links and flap connections provide damping of the flap train. The fulcrum links are judiciously mounted between adjacent convergent flaps.

4 Claims, 6 Drawing Sheets

C/D NOZZLE WITH SYNCHRONIZING RING LINK SUSPENSION

CROSS REFERENCES

The subject matter of this patent application relates to the subject matter of the patent application entitled "Compact Pressure Balanced Fulcrum-Link Exhaust Nozzle" filed by Alfredo Cires and Jennifer Groceman (Atty. Docket No. F-7677) and patent application entitled "Enclosed Pressure Balanced Sync Ring Nozzle" filed by Jose Luis Gutierrez, JR. (Atty. Docket No. F-7773) all of which are being filed contemporaneously and are assigned to the same assignee of this patent application.

TECHNICAL FIELD

This invention relates to a compact axisymmetrical convergent/divergent exhaust nozzle utilized on a gas turbine engine for a short take-off and vertical landing aircraft (STOVL) and particularly to mechanisms for synchronizing the flaps and guiding the combined pressure balancing piston and synchronizing ring.

BACKGROUND ART

There are a sundry of convergent/divergent (C/D) exhaust nozzles for gas turbine engines that are disclosed in the literature and that are utilized on jet and turbo jet engines for changing the throat configuration of the nozzle in order to improve engine performance during certain modes of operation. This is particularly the case in aircraft that are powered with gas turbine engines with augmentors. The exhaust nozzle may be configured in a two or three dimensional configuration with or without the capability of vectoring the exhaust gases. Obviously, the purpose of the vectoring nozzle is to effectuate directional change of or reversing thrust to brake the aircraft. Examples of prior art exhaust nozzles are disclosed in U.S. Pat. No. 3,792,815 granted to Swavely et al on Feb. 19, 1974 entitled "Balanced Flap Converging/Diverging Nozzle", U.S. Pat. No. 4,456,178 granted to Jones et al on Jun. 26, 1984 entitled "Exhaust Nozzle Assembly With Dual Unison Ring Structure", U.S. Pat. No. 4,456,178 granted to Wiley et al on May 8, 1984 entitled "Three-Dimensional Axially Translatable Convergent/Divergent Nozzle Assembly", U.S. Pat. No. 4,440,347 granted to Madden on Apr. 3, 1984 entitled "Simplified Means For Balancing The Loads On A Variable Area Nozzle", U.S. Pat. No. 4,440,346 granted to Wiley on Apr. 3, 1984 entitled "Axially Translatable Variable Area Convergent/Divergent Nozzle", U.S. Pat. No. 5,011,080 granted to Barcza on Apr. 30, 1991 entitled "Convergent/Divergent Nozzle Construction", and U.S. Pat. No. 5,215,256 granted to Barcza on Jun. 1, 1993 entitled "Flap Hinge Arrangement For A Convergent/Divergent Nozzle" all of which are assigned to the assignee common to the assignee of this patent application and U.S. Pat. No. 3,899,133 granted to Camboulives et al on Aug. 12, 1975 entitled "Nozzles Having A Variable Cross-Section".

Also well known in this art is that engineers and scientist are endeavoring to design and produce a gas turbine engine that is capable of use for STOVL operation for single as well as multiple engine aircraft. Also well known is that the exhaust nozzle may include positional flaps that are articulated to provide vectoring capabilities or the entire exhaust nozzle may be articulated by rotatable inter-connecting ducts similar to what is utilized in the Russian YAK-141 aircraft manufactured by Yakovlevin Aircraft in order to produce vectoring capabilities. This invention is concerned primarily with the types of variable convergent/divergent exhaust nozzles that are movable by means other than the components of the exhaust nozzle. In other words, a plurality of upstream ducts connected to the exhaust nozzle have the capability of rotating relative to one another to change the direction of the engine flow medium in said ducts and the rotation thereof rotates the entire exhaust nozzle from an axial position for horizontal flight to a radial position for vertical flight and attitudes therebetween and to a transverse position for producing yaw to the aircraft.

Amongst the problems associated with these types of nozzles are that the nozzle must be sufficiently short in order to provide adequate ground clearance during short takeoff and vertical landing operation. In addition certain types of STOVL propulsion systems that also include shaft driven lift fan require a high response, large turn-down-ratio nozzle to provide acceptable control of the thrust produced by the nozzle in concert with power extraction required in STOVL mode of operation.

To achieve an acceptable high response nozzle actuation system it is necessary to utilize actuators for varying the throat size of the C/D exhaust nozzle. These actuators typically are hydraulic types of actuators that utilize the engine's fuel for the hydraulic medium. This invention contemplates utilizing an hydraulic actuator utilizing fuel as the hydraulic medium.

This invention serves to improve on and solve several problems associated with the design of the nozzle disclosed in the patent application entitled "Exhaust Nozzle For Gas Turbine Engine" filed by Alfredo Cires and Jennifer Groceman, supra. As noted in the immediately above mentioned patent application the invention therein obviates the problems alluded to in the immediate above paragraph by balancing the loads of the flaps by utilizing a co-axially mounted pressurized piston that has the dual function of serving as a unison ring and a fulcrum link operatively connected to the convergent and divergent flaps.

This design provides a shortened C/D exhaust nozzle that 1) reduces the number of component parts in the kinematic systems, 2) reduce the coolant leakage because of the one piece load balancing piston design, 3) grounds the divergent flap of the C/D nozzle to the pivoting fulcrum links to enhance area ratio schedules, 4) reduces the stroke of the actuator by virtue of the fulcrum link kinematic design which provides a shorter convergent flaps resulting in a shorter overall length, less weight, less number of components and simplicity in design with an overall economic benefit.

To pressurize the combined piston/sync ring it is necessary to provide a sealed compartment and one wall of the compartment acts as the piston. This requires seals between the ring and static structure. The problem is acerbated because the sealed compartment rides on the same surfaces as the rollers. The design utilizes three circumferentially spaced actuators that locate the sync ring and the sync ring which is mounted on the rollers connects to each of the flaps, say 15 in this embodiment, via individual links and fulcrums. The aforementioned C/D nozzle lacked any device to synchronize the flap positions and keep the sync ring aligned.

Several designs to solve these problems were considered and not used because they were complex, required many parts or failed to prevent rotation about the engine center line and generally speaking did not provide a satisfactory solution. For example, the bellcrank linkage utilized on current C/D nozzles were considered and not only added more than two hundred parts but also added weight to the nozzle. Even though this contemplated design operated satisfactory it still left to be solved the rotation of the sync ring from rotating around the engine's center line. Curbs to guide the rollers were added to the static structure but since the same surface is utilized for sealing this presented a difficult sealing problem. In the heretofore known design the flaps were not synchronized relative to each other. Each fulcrum which is mounted to static structure lines up with one convergent flap. Each fulcrum carries two convergent links attached to the same convergent flap. The use of two links spreads the load on the convergent flap and provides space in the center for the divergent link.

I have obviated the problems alluded to in the above by providing means for synchronizing the flaps, guiding the sync ring and eliminating the sync ring rollers and thereby improve sealing and reduce overall weight of the nozzle. By virtue of this invention some parts of the heretofore known design were eliminated, no additional parts were required which results in a less complex design requiring fewer parts, restraint of the sync ring from rotating around the engine's center line.

In one aspect of this invention the heretofore known or prior art dogbone links typically used in this technology are superseded by H-shaped links. In the preferred embodiment all the links attaching the fulcrum to the sync ring are of the H-shaped design, which attains great rigidity and stability. Since the link suspension restrains the sync ring to its desired line of action, rollers are not required to guide it or prevent it from rotating. This allows the seal land to be devoid of any irregularities such as roller curbs noted in the above paragraph or indentations occasioned by the wear due to the roller loads.

In addition and in accordance with this invention the fulcrums are judiciously located so that they lie between two adjacent convergent flaps. The two convergent links that heretofore were connected to a single convergent flap is now connected to adjacent convergent flaps thereby obtaining synchronization of all the flaps. This can be seen by recognizing that each fulcrum drives two adjacent flaps. If one flap were to be displaced, both links to that flap would reposition their associated fulcrums. Since each fulcrum drives two flaps, this would cause both flaps adjacent to the displaced one to also move the same amount. Since all flaps are connected together in this manner in a continuous loop, this link arrangement provides synchronization with no additional parts. Additionally, in accordance with this invention H-links are utilized in the flap articulating system a redundant synchronization is evidenced which has the additional benefit of producing significant damping in a highly vibratory field.

SUMMARY OF THE INVENTION

An object of this invention is to provide an improved C/D exhaust nozzle construction that provides full sync ring restraint including rotation around the engine center line, provide smooth seal land without roller load surfaces or curbs for simpler sealing and less leakage, provides redundant flap synchronizing for more nozzle rigidity and damping, and reduces parts with a loss in overall nozzle weight.

A feature of this invention is the judicious location of the fulcrum and the attachment of the links to adjacent flaps for flap synchronization.

Another feature of the invention is the employment of H-shaped links that replace the heretofore used dogbone links for connecting the fulcrum to the sync ring.

The foregoing and other features of the present invention will become more apparent from the following description and accompanying drawings.

DETAILED DESCRIPTION OF THE PREFERRED EMBODIMENT

Figure 1:
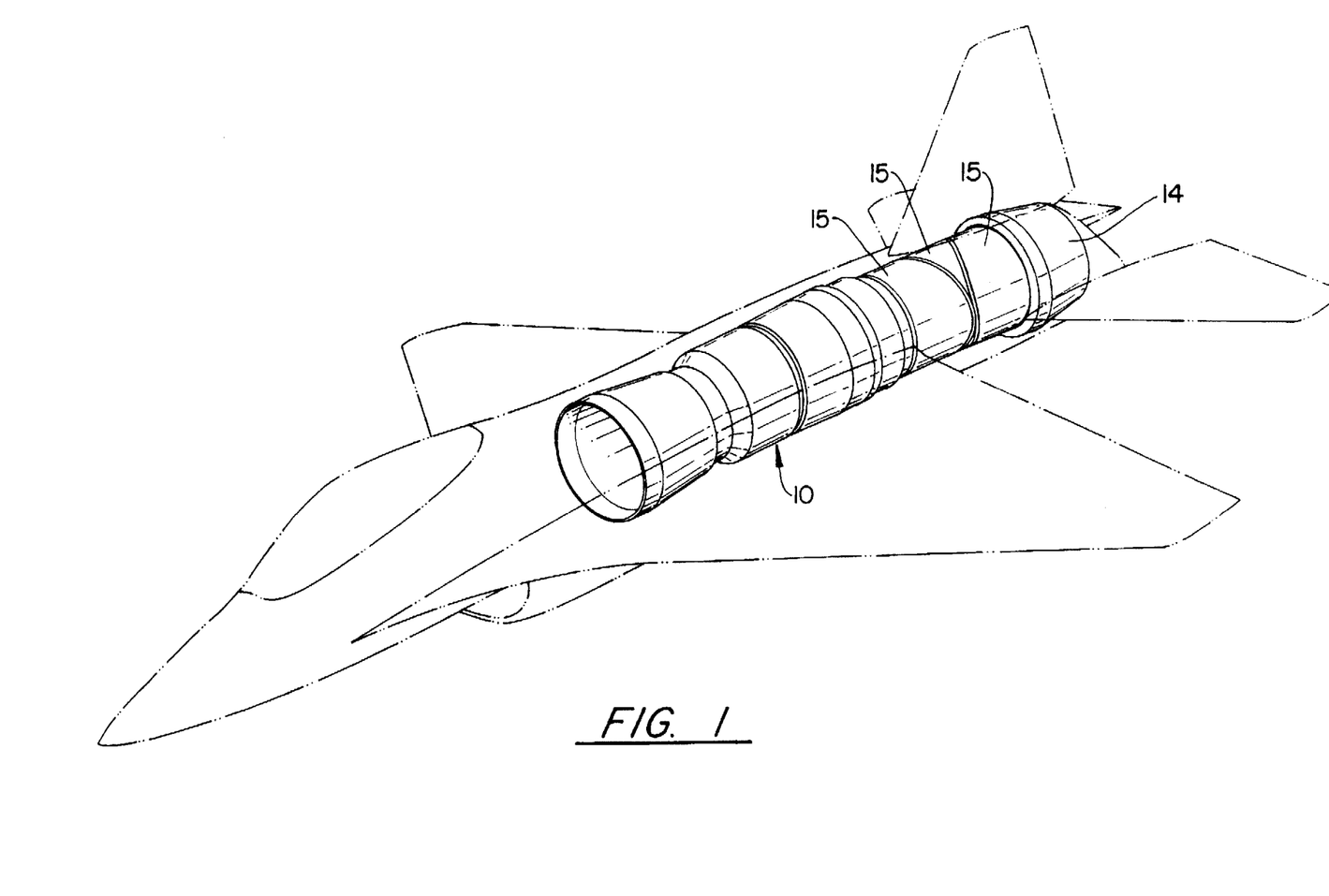
FIG. 1 is a view in phantom and perspective schematically illustrating the turbine power plant mounted in an aircraft with articulating ducts connected to an exhaust nozzle.
Figure 2:
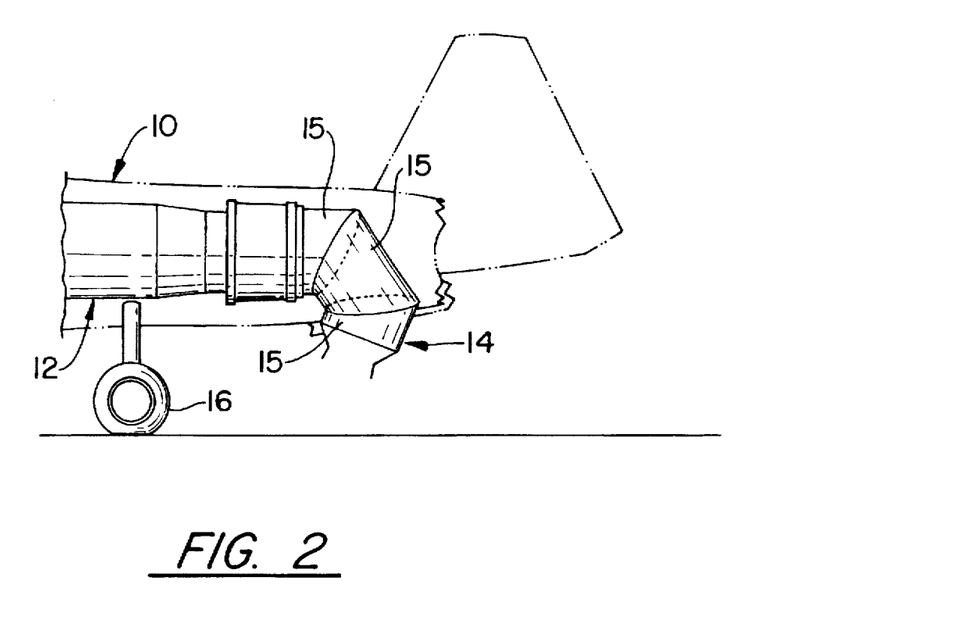
FIG. 2 is a partial and phantom views illustrating the ducts being articulated from the position in FIG. 1 for STOVL operation.

In its preferred embodiment this invention is utilized on an axisymmetrical C/D exhaust nozzle that is capable of use in a STOVL type of aircraft. The C/D nozzle is attached to a duct system 15 including three ducts that are mounted on three bearing which are counter rotatable for articulating the nozzle to vector control the aircraft. As seen in FIGS. 1 and 2 the engine generally indicated by reference numeral 10 is mounted in an aircraft generally indicated by reference numeral 12 which engine includes the exhaust nozzle generally indicated by reference numeral 14 and the three bearing ducts generally indicated by reference numeral 15. The ducts 14 are positioned in FIG. 1 for horizontal flight condition and in FIG. 2 for STOVL condition. Positioning the nozzle for obtaining the vectoring feature is by articulating the three ducts to rotate around the respective bearings to attain the desired attitude. As seen in FIG. 2 when the aircraft is on the ground and the wheels 16 extended and the exhaust nozzle is in STOVL condition, it is imperative that the length of the exhaust nozzle is sufficiently short so that it doesn't touch the ground.

Figure 3:
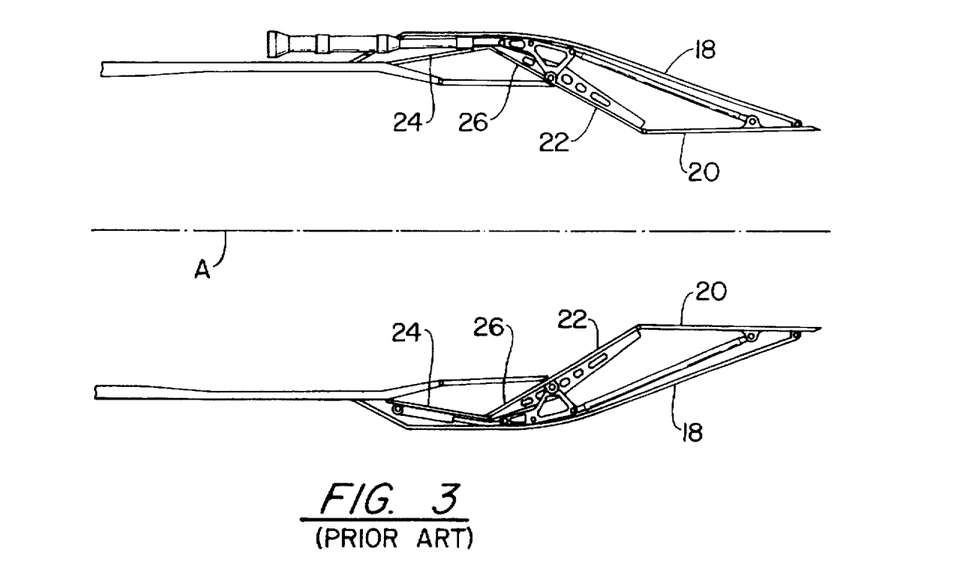
FIG. 3 is a schematic view of a prior art exhaust nozzle.

FIG. 3 exemplifies a typical prior art exhaust nozzle that if utilized in the embodiment disclosed in FIGS. 1 and 2, would not be capable of meeting the criteria noted above. As noted in this embodiment the exhaust nozzle consists of the external flaps 18, divergent flaps 20 and convergent flaps 22. In addition to these flaps the prior art exhaust nozzles require balancing flaps which are depicted by reference numerals 24 and 26. For a more detailed description of the prior art exhaust nozzle reference should be made to U.S. Pat. No. 3,792,815, supra and which is incorporated herein by reference.

The C/D nozzle illustrated in FIGS. 4 and 5 which are views partially in section and partially in elevation and perspective disclose a combined actuator synchronizing ring and pressure balancing piston (PBSR) 30, fulcrum links 32, convergent flaps 34, divergent flaps 36 and the attendant connecting links as will be more fully described hereinbelow. An external flap 39 for providing an aerodynamically clean surface is also provided. The fulcrum 32 is attached to the link 38 by the pivotal connection 40 and attached to the PBSR clevis 42 by the pivotal connection 44 which, in turn, is connected to the hydraulic actuator 46. In this embodiment three actuators are equally spaced about the axis A. The PBSR 30 consist of a toroidally shaped housing 48 that is coaxially mounted relative to the engine's center axis A and is completely inclosed by virtue of the static annular structure 50 for defining chamber 52. Chamber 52 is divided into sub-chambers 54 and 56 by the radially extending annular member 58. It will become apparent that the housing 48 moves axially relative to the static structure 50 and the chamber 56 serves as a working chamber such that the fluid admitted therein acts against the inner surface 60 of housing 48 much like the action of a typical piston. This pressure serves to urge the housing 48 toward the right as the pressure builds up in chamber 56 urging the PBSR clevis 42 and link 38 to rotate the fulcrum 32 about its pivot connection 62. Links 64 and 66 are respectively connected to the convergent flaps 34 via the pivotal connections 68 and 70 and the divergent flaps 36 via the pivotal connection 72 and the sliding connection 74 sliding in track 76 which in turn is integrally formed on the back surface of the flap 36. Obviously, the flaps 34 and 36 are hingedly connected to each other by the hinge connection 80 and the convergent flap is connected to the static structure 50 via the pivotal connection 82 and the fixed support arm 84. The PBSR 30 reacts the loads that are transmitted through the linkage and fulcrum from the convergent flaps and the divergent flaps to balance the load produced thereby. Essentially, this serves a similar purpose as the balancing flaps disclosed in the U.S. Pat. No. 3,792,815 supra, so that these components are eliminated and a significant reduction in the C/D nozzle length is realized.

A cooling liner 87 may be attached to the flap 34 for assuring the structural integrity of the parts. The cooling liner 87 is radially spaced from the flap 34 to define an axial passage for flowing fan air therein to cool the convergent flap. As noted, the conventional seal flaps 92 are utilized to prevent the engine working medium from escaping from the gas path between adjacent flaps.

Figure 4:
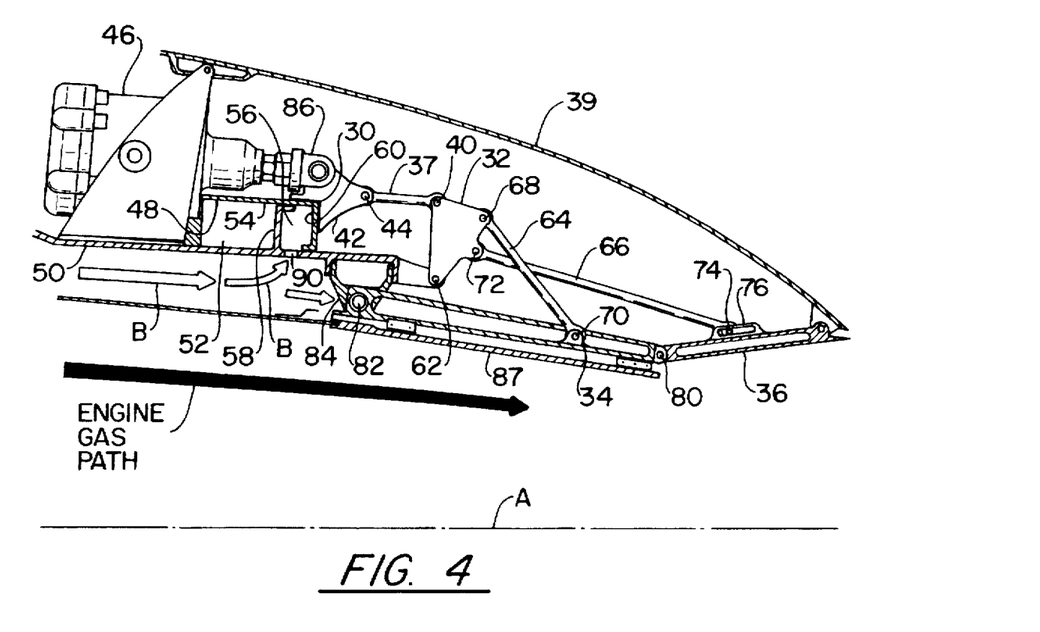
FIG. 4 is a view partly in elevation and partly in section schematically illustrating a C/D nozzle.
Figure 5:
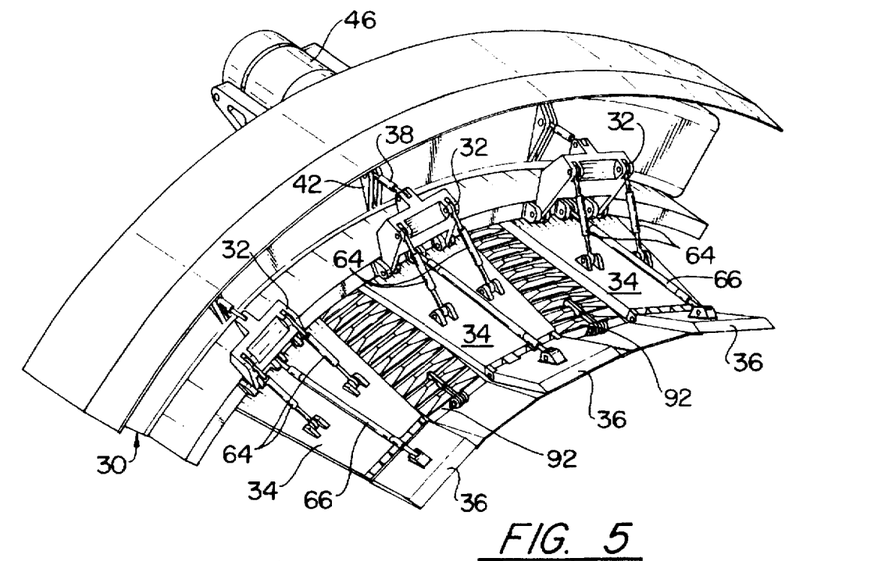
FIG. 5 is a partial view in perspective illustrating the C/D nozzle.

In operation, to deploy the flaps from the position shown in FIG. 4, for reducing the size of the throat of the nozzle (at the juncture of the divergent and convergent flaps) and changing the C/D configuration, the actuators 46 are actuated by fuel (not shown) in a well known manner which causes the actuator connecting rod 86 to move toward the right. At the same time the pressure from the fan discharge air depicted by arrows B which is admitted through a plurality of holes 90 spaced around the circumference (one being shown) causes the PBSR 30 to add to the force produced by actuator 46. This force is transmitted to the fulcrum 32 via the linkages as described above. The fulcrum 32, in turn, positions the flaps to the desired C/D configuration. Hence, pressure balancing is achieved by virtue of the fan air pressurized piston and since the piston is in reality a synchronizing ring which is attached to all of the convergent and divergent flaps the necessity of the balancing flaps disclosed in the prior art is eliminated. This obviously results in a shorter C/D exhaust nozzle and requires fewer parts. Since the divergent flap links 66 are grounded to the pivoting fulcrum links 32 the engine designer has a great deal of flexibility in selecting area ratio schedules.

It is estimated that there is substantially a 50% reduction in the convergent nozzle length over the heretofore known C/D nozzles. Also this kinematic system which requires less parts than heretofore known systems, results in substantially a 50% reduction in actuator stroke further reducing the overall length of the nozzle.

Figure 6:
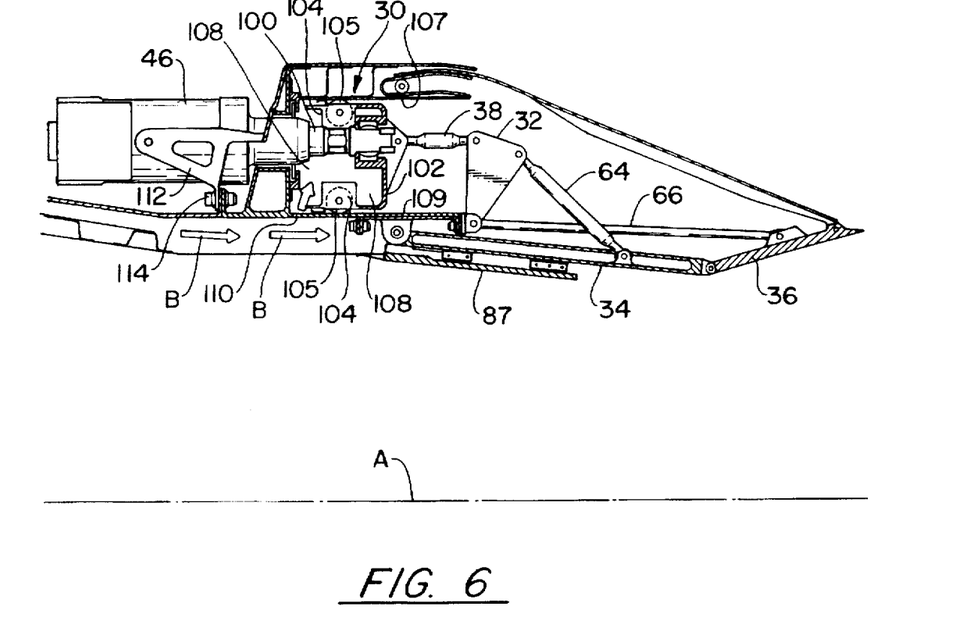
FIG. 6 is a view partly in elevation and partly in section illustrating another embodiment of a C/D nozzle.

FIG. 6 exemplifies another embodiment of this invention where the actuator 46 (like parts depicted in all the Figs. bear the same reference numerals) is mounted within the synchronous ring the PBSR 30. The PBSR is configured differently from that shown in FIG. 4 and comprises the housing 102 which is generally U-shaped in cross section and carries a pair of diametrically spaced pockets 104 supporting rollers 105 that roll on the surface of the annular static structure 107 and 109. These surfaces are sealing surfaces and require suitable sealing members. The working chamber 108, similar to the working chamber 56 in FIG. 4, receives pressurized fan discharge air depicted by arrows B. The position of the linkages connecting the fulcrum member 32 and actuator 46 and convergent and divergent flaps are slightly altered from that shown in FIG. 4. However, it is apparent from FIG. 6, that the operation of C/D nozzle with this slightly changed linkage system and synchronizing ring/piston combination is substantially the same as that described in connection with the embodiment depicted in FIG. 4. In this embodiment (FIG. 6) it will be appreciated that the mounting bracket 112 supporting the actuator 46 is also slightly modified so that the bracket is attached to flanges formed on the static structure and secured by a plurality of nuts and bolts 114 (one being shown). These modifications permit the exhaust nozzle to remain a full-hoop structure eliminating the weakening cut-outs and facilitating fabrication with these benefits:

1) The full-hoop configuration resists pressure and structural defections to maintain critical sealing surfaces in contact.

2) Placement of the actuators 46 within the synchronization ring reduces torsional moment caused by actuator load being offset from the fulcrum.

3) Airframe installation envelope is reduced by radially inboard relocation of actuators.

4) Synchronization ring is surrounded by static structure, allowing for positive sealing due to possible pressure induced deflections.

5) Relocation of sealing surfaces permits synchronization ring to be a four-sided full-hoop structure to enhance resistance to any variations in convergent flap or actuation load.

Figure 7:
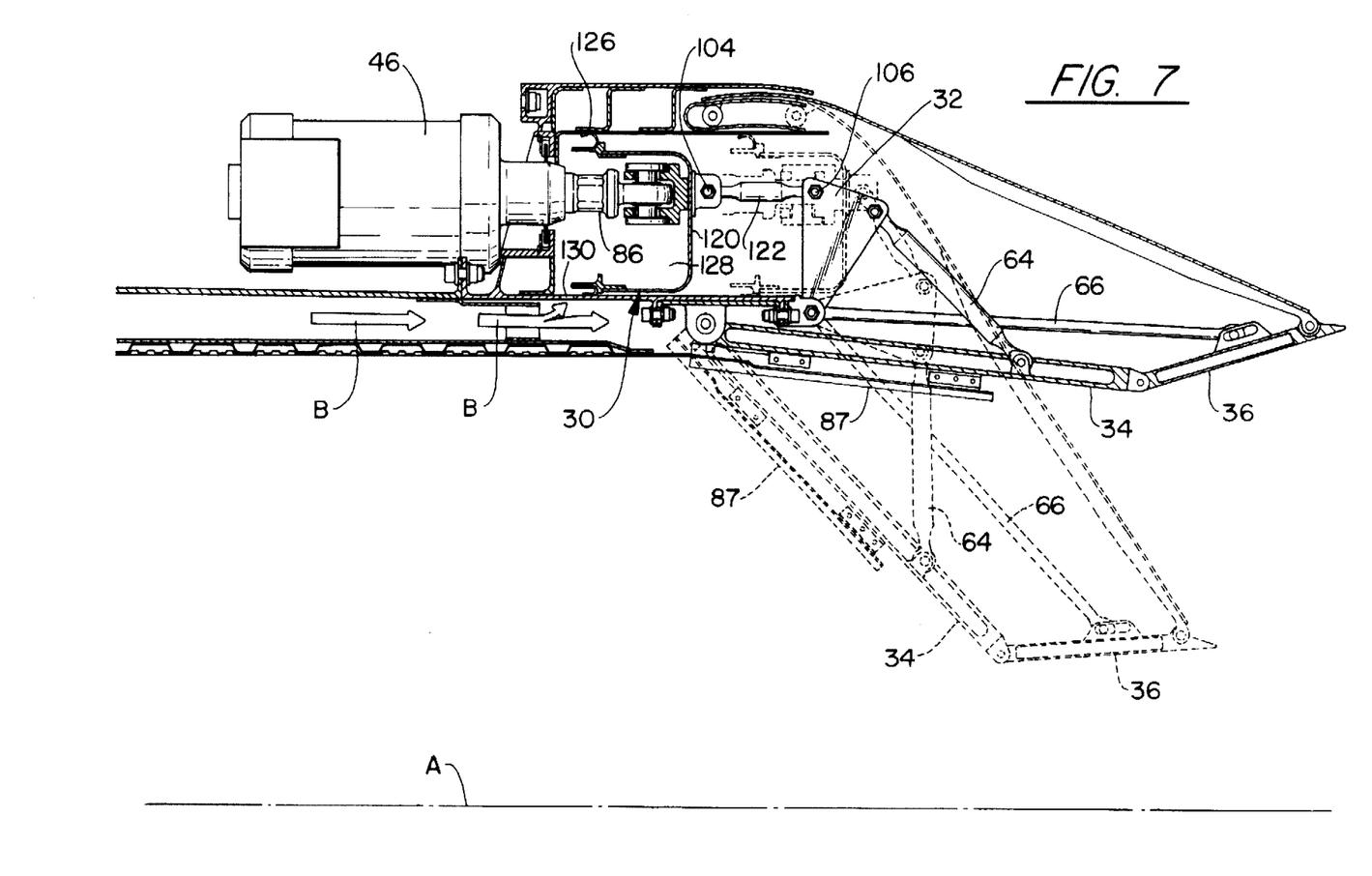
FIG. 7 is a view in section with the nozzle positioned in two different modes of operation for illustrating this invention.

As mentioned in the background portion of this patent application the flaps of the C/D nozzle depicted in FIG. 6 are not synchronized relative to each other so that the flaps can be moved independently of each other. The design doesn't provide means for keeping the sync ring aligned. Also, the rollers of the PBSR 30 ride on the same surface where the seals are located. This invention addresses these problems and is detailed in connection with FIGS. 7 and 8 which is a sectional view of the C/D nozzle positioned in two different operating modes. As can be seen in FIG. 7 the actuator 46 is attached to the static structure and the connecting rod is attached to the piston/sync ring 120 of the PBSR 30. The piston/sync ring 120 is annular and coaxially disposed relative to the axis A and is connected to the H-shaped links 122 by the nut and bolt assemblies 104 and 106 respectively. In this embodiment fifteen (15) H-links connect the piston/sync ring to the fulcrum links. While two of these links would constrain all degrees of freedom except the desired axial translation. The mounting with 15 H-shaped links attains rigidity and stability and meets the desired design criteria.

Moreover, because the link suspension of this invention restrains the piston/sync ring 120 to its desired line of action, no rollers are required to guide it or prevent it from rotating. This allows the seal land to be devoid of any irregularities such as roller curbs or indention on the surface caused from roller loads. The seal 126 between the end wall of piston/ sync ring 120 serves to seal the working chamber 128.

Figure 8:
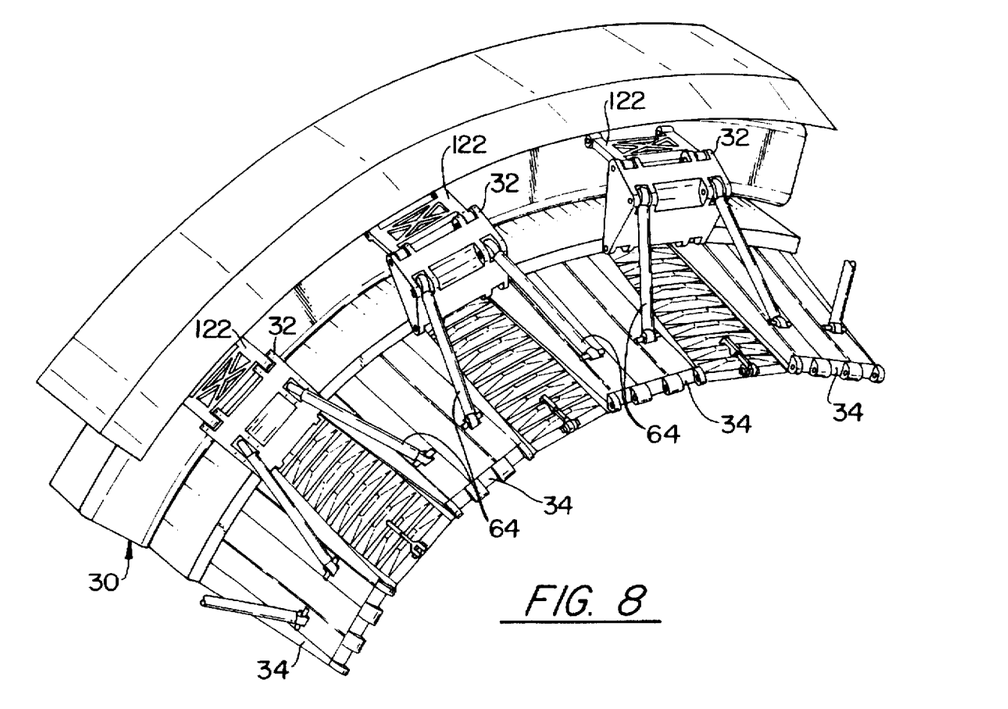
FIG. 8 is a partial view in perspective illustrating the link arrangement of this invention.

The fulcrum links as best seen in FIG. 8 are disposed between adjacent convergent flaps and each adjacent flap is connected to the fulcrum link by two (2) links 64. In the heretofore known designs each fulcrum lines up with one convergent flap and two convergent links from one fulcrum attach to the same convergent flap. This arrangement spreads the load on the convergent flap and provides sufficient space in the center of the divergent link that is connected from the fulcrum to the divergent flap as shown in FIG. 5. As discussed in this paragraph, the fulcrums are disposed between adjacent flaps and one of the two links is connected to the flap on one side of the fulcrum and the other is connected to the other side of the fulcrum. Since two convergent links connect to two adjacent convergent flaps, this arrangement still affords the load sharing and allows the divergent link to be disposed in the center of the convergent flap. This invention assures that the flaps are all in synchronization so that one flap cannot be moved relative to another. Since the nozzle is also synchronized by the H-shaped link arrangement, the synchronizing attained by the fulcrum-to-convergent flaps connections also provides synchronization. This redundant synchronization produces significant damping for the entire flap train.

In operation the loads imposed by the convergent flaps 34 and divergent flaps 36 on the PBSR 30 are balanced by the force of the piston/sync ring 120 generated by the pressurized fan air B admitted into chamber 128 via the plurality of apertures 130 (one being shown) formed in the static structure upstream of seal 126. When the actuator 46 is actuated the connecting rod 86 aided with the force of the piston/sync ring 120 causing the flaps to rotate about their respective connecting pivots similarly as that described in connection with the C/D nozzle depicted in FIG. 4 to seek the reduced throat configuration as denoted by the dash lines.

What has been shown by this invention is a C/D exhaust nozzle that affords the following advantages:

1) The number of component parts are reduced including the guide rollers disclosed in the co-pending application.

2) It provides a full sync ring restraint including rotation about the engine center line.

3) It provides smooth seal land with no roller load surfaces or curbs for simpler sealing and less leakage.

4) The redundant flap synchronization provides more nozzle rigidity and creates damping which is highly desirable in a highly vibratory environment.

5) Nozzle weight is reduced.

Although this invention has been shown and described with respect to detailed embodiments thereof, it will be appreciated and understood by those skilled in the art that various changes in form and detail thereof may be made without departing from the spirit and scope of the claimed invention.

I claim:

1. For a C/D exhaust nozzle for turbine engine power plants powering aircraft, said exhaust nozzle includes a plurality of convergent flaps and a plurality of divergent flaps, a synchronization ring means for positioning said convergent flaps and said divergent flaps, means for actuating said exhaust nozzle to change its C/D configuration, said means includes an actuator connected to said synchronization ring means, said synchronization ring means defining piston means for balancing the loads created by said convergent flaps and said divergent flaps, at least two fulcrum links adjacent to each other operatively connected to said synchronization ring, at least one first link interconnecting said at least one of said two fulcrum links to one of said plurality of convergent flaps and a second link interconnecting said at least said other of said two fulcrum links to another of said plurality of convergent flaps that is adjacent to said one of said plurality of convergent flaps.

2. For a C/D exhaust nozzle for turbine engine power plants powering aircraft as claimed in claim 1 including a H-shaped link interconnecting said fulcrum links and said synchronizing ring.

3. For a C/D exhaust nozzle for turbine engine power plant having a central axis powering aircraft, said engine having a fan and generating fan discharge air, said exhaust nozzle being coaxially disposed relative to said axis and including a plurality of convergent flaps and a plurality of divergent flaps, a synchronization ring means coaxially disposed relative to said axis for positioning said convergent flaps and said divergent flaps, actuator means for actuating said exhaust nozzle to change the C/D configuration, said means includes an actuator connected to said synchronization ring means, said synchronization ring means defining piston/sync ring coaxially disposed relative to said axis for balancing the loads created by said convergent flaps and said divergent flaps, a plurality of fulcrum links operatively connected to said synchronization ring, a plurality of H-shaped links interconnecting the fulcrum links to said piston/sync ring, a plurality of links interconnecting said fulcrum links to said plurality of convergent flaps, said plurality of links being arranged so that one link of said plurality of links interconnecting one of said fulcrum links and one of said convergent flaps and another link of said plurality of links interconnects another of said fulcrum links mounted adjacent thereto and said one of said convergent flaps whereby said convergent flaps are synchronized relative to each other.

4. For a C/D exhaust nozzle as claimed in claim 3 wherein each of said plurality of fulcrum links are disposed between each pair of adjacent convergent flaps of said plurality of convergent flaps.

* * * * *